United States Patent [19]

Streat

[11] 4,130,512
[45] Dec. 19, 1978

[54] ION EXCHANGE MATERIALS

[75] Inventor: Michael Streat, Wembley, England

[73] Assignee: National Research Development Corporation, London, England

[21] Appl. No.: 659,496

[22] Filed: Feb. 19, 1976

Related U.S. Application Data

[63] Continuation of Ser. No. 420,439, Nov. 30, 1973, abandoned.

[30] Foreign Application Priority Data

Jan. 10, 1973 [GB] United Kingdom ............... 12777/73

[51] Int. Cl.$^2$ .............................................. C08J 5/20
[52] U.S. Cl. ................................. 521/31; 204/159.22; 260/42.53; 526/72; 521/38
[58] Field of Search ............... 260/2.1 R, 2.1 E, 2.2 R

[56] References Cited

U.S. PATENT DOCUMENTS

| | | | |
|---|---|---|---|
| 2,460,516 | 1/1949 | Luaces ............................ | 260/2.1 R |
| 3,352,800 | 11/1967 | Smith et al. ...................... | 260/2.1 E |

FOREIGN PATENT DOCUMENTS 208942  1/1968  U.S.S.R.

OTHER PUBLICATIONS

Egorov et al., *Izv. Akad. Nauk. SSR. Ser. Khim.*, 1965(11), 2071–2072.
Egorov et al., *Dokl. Akad. Nauk, SSSR*, 146, 1360–1362 (1962).
Wagner, *J. Polymer Science*, 25, 500–501 (1957).
Billmeyer, *Textbook of Polymer Science*, Interscience Publ's, N.Y. (1962), pp. 326–329.
Cotton et al., *Advanced Inorganic Chemistry*, Interscience Publishers, N.Y. (1966), p. 476.
Iler, *The Colloid Chemistry of Silica and Silicates*, Cornell University Press, Ithaca, N.Y. (1955), pp. 84, 85 & 269–272.

*Primary Examiner*—Walter C. Danison

[57] ABSTRACT

A process for the production of a particulate ion exchange material which comprises heating an inorganic material to produce a porous inert inorganic substrate, adsorbing an organic monomer into the substrate and polymerizing the adsorbed monomer so that the resultant polymer is retained within the pores of the substrate, and, if necessary, introducing ion exchange functional groups into the polymer.

13 Claims, No Drawings

ION EXCHANGE MATERIALS

This is a continuation, division of application Ser. No. 420,439, filed November 30, 1973, now abandoned.

This invention relates to ion exchange materials and more particularly to particulate ion exchange materials having a relatively high specific gravity.

Conventional synthetic organic ion exchange resins are usually prepared by suspension co-polymerisation of styrene or an acrylic monomer with a cross linking agent such as divinylbenzene and subsequent attachment of ionogenic functional groups. Typical cation exchange resins contain sulphonic acid or carboxylic acid groups whereas anion exchange resins usually contain tertiary or quaternary amino side chain groups. Synthetic organic ion exchange resins are known to be exceedingly stable towards most organic and inorganic solvents have a high exchange capacity, are selective, and are normally supplied as spherical particles of reasonably close size range. However, the conventional resins swell and shrink in contact with aqueous solutions and this is known to cause physical damage due to bead fracture. Also, resin beads have a relatively low specific gravity, usually in the range 1.01 to 1.40 depending on the ionic form. This is therefore a limiting factor in the operation of any ion exchange contactor based on upward flow of the process solution.

Inorganic materials, such as natural clays, and zeolites, are also known to exhibit ion exchange behaviour and have a considerably greater specific gravity than the ion exchange resins. However, such inorganic materials often possess a low exchange capacity for cations, and are less chemically stable than their organic counterparts, thus restricting their use to carefully controlled pH ranges.

According to the present invention an ion exchange material having a relatively high specific gravity is prepared by adsorbing organic monomers into a prepared porous inorganic substrate and subsequently polymerising the monomer within the pores of the substrate so that the resultant polymer is retained therein.

The present invention provides a process for the production of a particulate ion exchange material which comprises heating an inorganic material to produce a porous inert inorganic substrate, adsorbing an organic monomer into the substrate and polymerising the adsorbed monomer so that the resultant polymer is retained within the pores of the substrate, and, if necessary, introducing ion exchange functional groups into the polymer.

A variety of inorganic materials may be successfully heat treated to produce the porous inorganic substrate. Particularly preferred are the inorganic oxide gels, for example silica, alumina, zirconia, titania, stannic oxide, iron oxide and inorganic silicates such as natural clays and zeolites. The effect of the heat treatment is to render the inorganic material less susceptible to acid and alkali attack. Heat treatment further serves to dehydrate the metal oxide gels causing a reduction in the specific surface area and in some cases an alteration of pore volume. In general excessive heat treatment is found to have a deleterious effect upon the physical properties of the resultant porous inert inorganic substrate, and thus the heating should be sufficient to increase the resistance to chemical attack of the substrate without calcining or sintering. Temperatures within the range of from 100° to 550° C. have been found to be suitable in many cases, and particularly preferred temperatures are within the range of from 300° to 450° C. The time for which the heat treatment is carried out will be dependent upon the temperature, but is usually from 4 to 24 hours. Excellent results have been obtained with stannic oxide gel and silica gel, and these are the preferred substrates. Stannic oxide gel is readily prepared by hydrolysing stannic chloride and gelifying in solution at a pH in the range 2 to 5. The particle size of the gel can be controlled very easily but is dependent upon the washing procedures adopted during preparation. Preferably the particle size is within the range of from 0.005 to 0.10 centimeter.

The organic monomer is desirably such that the molecular size of the monomer unit is less than the average diameter of the pore opening of the porous substrate so that there is no appreciable steric hindrance during adsorption. The largest dimension of the pore opening in stannic oxide gel is about 50 angstroms. The monomer is also such that after polymerisation the resultant polymer contains functional groups useful for ion exchange reactions, or can be chemically treated so as to introduce such groups into the polymer. For example, acrylic acid or acrylic esters can be used to prepare weak acid carboxylic resins, styrene and sulphonated styrene can be used to prepare strong acid resins, vinyl pyridine and substituted vinyl pyridine can be used to prepare weak base anion exchange resins which can be methylated to produce quaternary ammonium strong base resins, and other nitrogen-containing vinyl monomers can be used to prepare anion exchange materials, for example acrylamide and vinyl amines. The monomer may be polymerised in the presence of a cross-linking agent such as divinyl-benzene, which may be used to facilitate polymerisation and to improve retention of the organic polymer within the pores of the substrate.

In order to adsorb the organic monomer into the prepared substrate, the particles of the substrate may be soaked in the monomer, or the monomer may be distilled on to the particles of substrate and adsorbed from the vapour phase. These steps can be performed repeatedly to enhance uptake of monomer. Prior to the adsorption, the substrate is preferably first evacuated to remove water vapour and flushed with oxygen-free nitrogen.

A number of methods may be used for polymerising the organic monomer within the pores of the substrate. For example the polymerisation may be chemically initiated by heating in the presence of a radical initiator, for example benzoylperoxide or 2,2′-azobisisobutyronitrile. Reaction may conveniently be carried out by heating on a water bath. Alternatively the polymerisation may be carried out using ultraviolet light, gamma ray, or X-ray initiation. In the case of ultraviolet light initiation, the reaction is preferably performed in the absence of air for periods of up to 65 hours. In the case of gamma ray irradiation, doses of between 5 to 10M rads have been found to produce the desired result.

After polymerisation the product in each case may be washed with ethanol, dilute acid and water to remove any homopolymer adhering or occluded to the surface of the particles. This treatment also serves to condition the product ready for use.

If necessary the products may be treated so as to introduce ion exchange functional groups into the polymer at this stage.

The process of the present invention may be used to produce particulate ion exchange materials having many desirable properties. Weak acid and weak base ion exchange materials may be prepared having ion exchange capacities in the range of from 0.3 to 0.7 milliequivalents/gram. The specific gravity of the ion exchange materials of the invention may be as high as 4 grams per centimeter$^3$ and the particle size may be readily controlled to meet the requirements of the particular application. The ion exchange materials of the invention do not swell substantially on the macromolecular scale and it is accordingly possible to produce a product with a volumetric capacity of about 2 milliequivalents per cm$^3$ settled bed. This compares very favourably with the capacity of conventional synthetic organic ion exchange resins.

The invention is illustrated by the following Examples:

EXAMPLE 1

Stannic chloride (pentahydrate: 500 g) is dissolved in water (2.5 l) and concentrated ammonia (ca 350 ml) is added dropwise over a period of about 1½ hours. After the addition of alkali the pH value is adjusted, if necessary, to between 4 and 5 and a white gelatinous precipitate is formed. This is filtered and washed three times with an equal quantity of water, then left to dry in air for about 5 days. The gel particles are washed with 1 N nitric acid and with water and the solid finally dried in air. The product yields about 220 g of stannic oxide gel.

A sample of the gel (10 g) is heated in a muffle furnace at 450° C. for 24 hours and cooled in a dessicator over calcium chloride. The particles are evacuated at 100° C. for 2 hours and flushed with oxygen free nitrogen. Acrylic acid is admitted and the particles are soaked by immersion still under nitrogen. The mixture is heated in a water bath in the presence of 0.02 g azo-bis-isobutyronitrile. There is a violent reaction almost immediately and the mixture is heated for a further 30 minutes. A large excess of water is used to soak the product for 3 hours in order to loosen the adhering particles. Washing with 0.02 N NaOH completely separates the particles from the homopolymer. The particles are then filtered, washed with 1 N nitric acid, water, filtered again and dried. This product (about 10 g) is a weak carboxylic acid ion exchange material with a capacity of 0.65 meg/g.

EXAMPLE 2

A sample of the gel (10 g) used in Example 1 is heated in a muffle furnace at 300° C. for 24 hours and cooled in a dessicator over calcium chloride. The gel is soaked in a mixture of 4-vinylpyridine (10 cm$^3$) and 0.02 g azo-bis-isobutyronitrile for about 18 hours. The excess monomer is decanted and the gel is heated on a water bath for 4 hours. The hard, black particles are softened in warm alcohol and placed in a Soxhlet extraction unit and treated for 4 hours with warm alcohol to remove the free homopolymer. The monomer adsorption, reaction and alcohol treatment are repeated for a second time to increase the uptake of polyvinylpyridine. The sample is treated with 0.1 M hydrochloric acid for 24 hours with occasional shaking. The resin is then shaken with 1 M ammonium hydroxide for 24 hours, then washed with water until the washings are neutral to pH paper. The sample is dried at 80° C. for 3 hours. The weak base capacity is 0.14 meg./g. This resin exchanges soluble uranium (1 g uranium/liter) from a dilute sulphuric acid solution at a pH value of 1.8 with a capacity of about 14 mg uranium/g resin.

EXAMPLE 3

A sample of proprietary silica gel (10g) of high pore volume is heated at 150° C. for 3 hours and cooled in a dessicator containing calcium chloride. An identical procedure of adsorption of 4-vinylpyridine and azo-bis-isobutyronitrile, reaction and washing is performed as in Example 2. The operation is repeated to enhance the uptake of polymer. The product is treated and washed as described above. The capacity of this resin for the uptake of uranium from a dilute sulphuric acid solution (1 g uranium/liter) is about 66 mg uranium/g resin.

I claim:

1. A process for the production of a particulate ion exchange material of increased resistance to acid and alkali attack which comprises heating a particulate inorganic material selected from the group consisting of inorganic oxide gels and inorganic silicates, to a temperature of from 100° to 550° C. to produce a porous inert inorganic substrate, adsorbing an ethylenically unsaturated organic monomer into the substrate and polymerising the adsorbed monomer so that the resultant polymer is retained within the pores of the substrate, and, if necessary, introducing ion exchange functional groups into the polymer.

2. A process according to claim 1, in which the inorganic material is stannic oxide gel or silica gel.

3. A process according to claim 1, in which the inorganic material is heated to a temperature of from 300° to 450° C.

4. A process according to claim 3, in which the inorganic material is heated for a period of from 4 to 24 hours.

5. A process according to claim 1, in which the particle size of the inorganic material is from 0.005 to 0.10 cm.

6. A process according to claim 1, in which the organic monomer is such that the molecular size of the monomer unit is less than the average diameter of the pore opening of the porous inert inorganic substrate.

7. A process according to claim 1, in which the organic monomer is acrylic acid, an acrylic ester, styrene, a sulphonated styrene, vinyl pyridine, a substituted vinyl pyridine, acrylamide, or a vinyl amine.

8. A process according to claim 1, in which the monomer is polymerised in the presence of a cross-linking agent.

9. A process according to claim 1, in which the particles of porous inert inorganic substrate are soaked in the monomer, or in which the monomer is distilled on to the particles of substrate and adsorbed from the vapour phase.

10. A process according to claim 1, in which prior to the adsorption the porous inert inorganic substrate is first evacuated to remove water vapour and flushed with oxygen-free nitrogen.

11. A process according to claim 1, in which the polymerisation is chemically initiated by heating in the presence of a radical initiator, or initiated using ultraviolet light, gamma radiation, or x-ray initiation.

12. An ion-exchange material of increased resistance to acid and alkali attack having a relatively high specific gravity prepared by heating an inorganic material selected from the group consisting of inorganic oxide gels and inorganic silicates, to a temperature of from 100° C. to about 550° C., to form a porous, inert inorganic substrate, adsorbing an ethylenically unsaturated organic monomer into the porous inorganic substrate and subsequently polymerising the monomer within the pores of the substrate so that the resultant polymer is retained therein.

13. An ion-exchange material prepared by a process according to claim 1.

* * * * *

UNITED STATES PATENT OFFICE
CERTIFICATE OF CORRECTION

Patent No. 4,130,512  Dated Dec. 19, 1978

Inventor(s) MICHAEL STREAT

It is certified that error appears in the above-identified patent and that said Letters Patent are hereby corrected as shown below:

On the first page, under the heading "Foreign Application Priority Data" change the number of the United Kingdom application from "12777/73" to -- 1277/73 --.

Signed and Sealed this

Twenty-second Day of May 1979

[SEAL]

Attest:

RUTH C. MASON
Attesting Officer

DONALD W. BANNER
Commissioner of Patents and Trademarks